United States Patent
Raty

(10) Patent No.: US 6,900,266 B2
(45) Date of Patent: May 31, 2005

(54) METHOD OF COMPOUNDING A MULTIMODAL POLYETHYLENE COMPOSITION

(75) Inventor: Marie-France Raty, Genappe (BE)

(73) Assignee: Solvay Polyolefins Europe-Belgium, Brussels (BE)

(*) Notice: Subject to any disclaimer, the term of this patent is extended or adjusted under 35 U.S.C. 154(b) by 0 days.

(21) Appl. No.: 10/480,536

(22) PCT Filed: Jun. 10, 2002

(86) PCT No.: PCT/EP02/06365
§ 371 (c)(1),
(2), (4) Date: Dec. 12, 2003

(87) PCT Pub. No.: WO02/102562
PCT Pub. Date: Dec. 27, 2002

(65) Prior Publication Data
US 2004/0192819 A1 Sep. 30, 2004

(30) Foreign Application Priority Data
Jun. 14, 2001 (EP) .......................................... 01202289

(51) Int. Cl.⁷ .............................................. C08L 71/12
(52) U.S. Cl. ...................................... 524/611; 526/352
(58) Field of Search ........................... 524/611; 526/352

(56) References Cited

U.S. PATENT DOCUMENTS 3,381,060 A * 4/1968 Peacock et al. ............. 525/240
5,336,573 A * 8/1994 Zuckerbrod et al. ........ 429/252

FOREIGN PATENT DOCUMENTS

| EP | 0 645 232 A1 | 3/1995 |
| EP | 0 713 889 A2 | 5/1996 |
| WO | WO 00/01473 | 1/2000 |

* cited by examiner

Primary Examiner—William K. Cheung
(74) Attorney, Agent, or Firm—Finnegan, Henderson, Farabow, Garrett and Dunner, L.L.P.

(57) ABSTRACT

Method of compounding a multimodal polyethylene composition in a compounding device, wherein a) the total residence time of the polyethylene composition in the compounding device is at least 1.5 minutes, b) the total drive specific energy (SEC) applied on the polyethylene composition is from 0.270 to 0.460 kWh/kg, c) optionally, a specific cooling energy (SCC) of at most 0.200 kWh/kg is applied on the polyethylene composition, d) the total specific energy, which is the difference between the total drive specific energy SEC and any specific cooling energy SCC, applied on the polyethylene composition is from 0.220 to 0.330 kWh/kg.

15 Claims, 1 Drawing Sheet

METHOD OF COMPOUNDING A MULTIMODAL POLYETHYLENE COMPOSITION

BACKGROUND OF THE INVENTION

The present invention relates to a method of compounding of multimodal polyethylene compositions and more particularly to a method of compounding a multimodal polyethylene composition comprising a low molecular weight ethylene polymer and a high molecular weight ethylene polymer.

Multimodal polyethylene compositions are well known in the art. The term "multimodal" polyethylene compositions refers to the form of the molecular weight distribution curve of the composition, i.e. the appearance of the graph of the polymer weight fraction as function of its molecular weight. When a polymer is produced in a sequential step process, utilising reactors coupled in series and using different conditions in each reactor, the different fractions produced in the different reactors will each have their own molecular weight distribution. When the molecular weight distribution curves from these fractions are superimposed into the molecular weight distribution curve for the total resulting polymer product, that curve will show two or more maxima or at least be distinctly broadened in comparison with the curves for the individual fractions. Such a polymer product, produced in two or more serial steps, is called bimodal or multimodal depending on the number of steps. However, the multimodal polyethylene compositions may alternatively be produced by physical mixing of the different components prepared separately.

It is well known in the art that when producing a polymer compound that can be used for the manufacture of different objects, the ingredients thereof, such as the different polymers, additives, etc, should be mixed intimately in order to obtain a compound as homogeneous as possible. Usually, this mixing is done in a compounding device wherein the ingredients are mixed together and the polymers and optionally some of the additives are melted so that intimately mixing can occur. The melt is then extruded into a rod, cooled and granulated. In this form the resulting compound can then be used for the manufacturing of different objects.

Although the conventional compounding tools such as tandem mixer-single screw extruders, mixer-gear pumps and twin screw extruders with or without gear pump, offering residence time in the order of 1.5 minutes or less, generally lead to acceptable quality results in compounding polymer compositions, problems are encountered when compounding multimodal polymer compositions, and more particularly multimodal polymer compositions comprising a low molecular weight ethylene polymer and a high molecular weight ethylene polymer. When compounding multimodal polymer compositions, e.g. for the manufacture of pipes, so called <<white spots>> occur in the compounded material. These white spots have a size of about 10–80 µm and consist mainly of high molecular weight polymer particles that have not been adequately compounded in the composition. In addition to being disfiguring the white spots may adversely influence the strength of the composition. Further, when compounding multimodal polymer compositions, e.g. for the production of film, gel particles with a size of about 0.01–1 mm often occur. These gel particles appear as disfiguring heterogeneities in the finished film and consist mainly of high molecular weight polymer particles that have not been adequately compounded, i.e. dispersed, in the composition. The above described white spots and gel particles are a serious problem in the polymer industry and a solution to the problem would mean the removal of an obstacle to use otherwise superior multimodal polymer compositions.

U.S. Pat. No. 6,031,027 aims to overcome this problem by providing a method of compounding a multimodal polymer composition wherein the composition is maintained at a temperature range from 10° C. below to 10° C. above the melting point of the low molecular weight polyethylene polymer during a period from 10 to 60 seconds. Such method needs a very good control of the temperature of the polymer composition and is therefore difficult to execute on the currently used industrial compounding devices.

WO 00/24821 relates to an extrusion process of particular multimodal polyethylene compositions using an extruder equipped with a gear pump. However this technology does not permit to obtain very good results with all multimodal compositions, in particular with multimodal compositions rich in low molecular weight polymer.

The present invention provides a new method of compounding multimodal polymer compositions which overcomes the above mentioned problems and which permits to obtain a very homogeneous compound which has a reduced level of white spots and/or gels and which has superior mechanical properties.

SUMMARY OF THE INVENTION

The present invention therefore relates to a method of compounding multimodal polyethylene composition in a compounding device wherein a) the total residence time of the polyethylene composition in the compounding device is at least 1.5 minutes, b) the total drive specific energy (SEC) applied on the polyethylene composition is from 0.270 to 0.460 kWh/kg, c) optionally, a specific cooling energy (SCC) of at most 0.200 kWh/kg is applied on the polyethylene composition, d) the total specific energy, which is the difference between the total drive specific energy SEC and the specific cooling energy SCC, applied on the polyethylene composition is from 0.220 to 0.330 kWh/kg.

DETAILED DESCRIPTION OF THE INVENTION

Figure 1:
FIG. 1 is a schematic view of one way to execute the method according to the invention.

The present invention is related to the compounding of a multimodal polyethylene composition. For the purpose of the present invention, multimodal polyethylene composition is meant to designate compositions comprising at least a low molecular weight ethylene polymer and at least a high molecular weight ethylene polymer. For the purpose of the present invention the expression <<ethylene polymer>> comprises ethylene homopolymers and ethylene copolymers comprising at least 90% by weight of units derived from ethylene. In connection with the present invention the molecular weight of the polymer is defined by way of its melt flow rate, such as measured according to ASTM 1286-90b standard. For a specific type of polymer the higher the value of its melt flow rate, the lower its mean molecular weight. Generally, the low molecular weight ethylene polymer has a melt flow rate $MI_2$, measured at 190° C. under a 2.16 kg load according ASTM 1286-90b, of 0.1 to 5000 g/10 min, preferably from 100 to 2000 g/10 min. Generally, the high molecular weight ethylene polymer has a melt flow rate HLMI, measured at 190° C. under a 21.6 kg load according ASTM 1286-90b, from 0.001 to 10.0 g/10 min, preferably from 0.001 to 1.0 g/10 min. The multimodal polyethylene compositions as determined above comprise generally from 30 to 70% by weight of the low-molecular ethylene polymer and from 30 to 70% by weight of the high-molecular ethylene polymer.

In the method according to the invention, the total residence time of the multimodal polyethylene composition in the compounding device is preferably at least 2 and more preferably at least 3 minutes, most preferably at least 4.5 minutes. Generally, the total residence time of the polyethylene composition in the compounding device does not exceed 15 minutes, preferably not 10 minutes. The total residence time of multimodal polyethylene in the compounding device is calculated based on free volume and fill factor of the compounding device, rate (polymer throughput), screw/rotor speed, screw/rotor conveying factor (supplied by the manufacturer) and density of the molten polyethylene composition (0.7636 g/cm³ at 190° C.). The calculated residence time values are confirmed by a manual measurement using a colour tracer introduced at the entry of the compounding device and detected at the exit of the compounding device. The values of residence time quoted in connection with the present invention refer to the peak of the residence time distribution function, corresponding to the majority of the polymer particles; they do not refer to the maximum residence time of the minority of particles in the long tail of the distribution.

In the method according to the invention, the total drive specific energy (SEC) applied on the polyethylene composition is preferably at least 0.305 kWh/kg. Good results have been obtained when the total specific energy (SEC) applied on the polyethylene composition was at least 0.330 kWh/kg. The total drive specific energy (SEC) applied on the polyethylene composition preferably does not exceed 0.415 kWh/kg. Good results have been obtained when the total drive specific energy (SEC) applied on the polyethylene composition did not exceed 0.360 kWh/kg. In the method according to the invention, the total drive specific energy (SEC) applied on the polyethylene composition is the ratio of consumed power in the compounding device, expressed in kW, and the rate of polymer composition throughput in the compounding device, expressed in kg/h.

According to a preferred variant of the method according to the invention, the compounding device is equipped with a cooling device such that a specific cooling energy (SCC) can be applied on the polyethylene composition. The specific cooling energy (SCC) applied on the polyethylene composition is calculated from the temperature difference of the cooling medium at the inlet and outlet of the cooling device and the flow rate and specific heat capacity of the cooling medium.

In the method according to the invention, the specific cooling energy (SCC) applied on the polyethylene composition is preferably lower than 0.145 kWh/kg, most preferably lower than 0.120 kWh/kg. Generally, when applied the specific cooling energy (SCC) is at least 0.045 kWh/kg, preferably at least 0.070 kWh/kg, most preferably at least 0.080 kWh/kg.

In the method according to the invention, the total specific energy, which is the difference between the total drive specific energy SEC and any specific cooling energy SCC applied on the polyethylene composition, is preferably at least 0.240 kWh/kg, most preferably at least 0.250 kWh/kg. The total specific energy applied on the polyethylene composition does preferably not exceed 0.300 kWh/kg.

The compounding device used in the method according the invention can be any equipment that, batchwise or continuously, can provide the conditions (in terms of residence time and specific energy applied to the multimodal polyethylene composition) of the invention. According to a preferred embodiment of the invention, the compounding device comprises at least one melting zone preceding at least one homogenising zone.

By "melting zone" is meant a zone where the specific energy applied to the polyethylene composition is used to melt the polymer composition, with or without homogenising efficiency. This melting implies that the drive specific energy applied to the polyethylene composition in this melting zone ($SEC_{melting}$) is controlled. Generally the drive specific energy applied to the polyethylene composition in the melting zone ($SEC_{melting}$) does not exceed 0.260 kWh/kg, preferably not 0.240 kWh/kg. Generally, the drive specific energy applied to the polyethylene composition in this melting zone ($SEC_{melting}$) is at least 0.190 kWh/kg, preferably at least 0.200 kWh/kg. The drive specific energy ($SEC_{melting}$) is the ratio of consumed power in the melting equipment, expressed in kW, and the rate of polymer composition throughput in the melting zone, expressed in kg/h.

The residence time of the polyethylene composition in the melting zone is generally at least 10 seconds, preferably at least 15 seconds. The residence time of the polyethylene composition in the melting zone does generally not exceed 60 seconds, preferably not 45 seconds.

Generally, the melt temperature of the polyethylene composition coming out of the melting zone is from 220 to 300° C., preferably from 240 to 270° C. Most preferred the melt temperature of the polyethylene composition coming out of the melting zone is from 250 to 260° C. The melt temperature is measured with a temperature probe immersed 2 centimeters deep in the polymer at the exit of the melting equipment.

The average shear rate applied in the melting zone is generally between 30 and 500 $s^{-1}$.

By homogenising zone is meant a zone in which intensive homogenisation of the multimodal polyethylene composition occurs. The temperature of the polyethylene composition entering the homogenising zone is generally from 220 to 300° C., preferably from 240 to 270° C. Most preferred the temperature of the polyethylene composition entering the homogenising zone is from 250 to 260° C.

The residence time of the polyethylene composition in the homogenising zone is generally at least 1.5 minutes, preferably at least 2 minutes. Most preferably, the residence time in the homogenising zone is at least 3 minutes. The residence time of the polyethylene composition in the homogenising zone does generally not exceed 14 minutes, preferably not 9 minutes.

The drive specific energy applied to the polyethylene composition in the homogenising zone ($SEC_{homogenising}$) generally does not exceed 0.200 kWh/kg, preferably not 0.175 kWh/kg. Generally, the drive specific energy applied to the polyethylene composition in this homogenising zone ($SEC_{hormogenising}$) is at least 0.080 kWh/kg, preferably at least 0.105 kWh/kg. The drive specific energy $SEC_{homogenising}$ is the ratio of consumed power in the homogenising equipment, expressed in kW, and the rate of polymer composition throughput in the homogenising zone, expressed in kg/h.

Preferably, cooling is applied in this homogenising zone, generally through circulation of refrigerant in the envelope of the homogenising device, which at least partially compensates the specific drive energy consumption in this homogenising zone. This specific cooling energy ($SCC_{homogenising}$) is generally at least 0.045 kWh/kg, preferably at least 0.070 kWh/kg and most preferably at least 0.080 kWh/kg. This specific cooling energy generally does not exceed 0.145 kWh/kg, preferably not 0.120 kWh/kg.

Generally, the melt temperature of the polyethylene composition coming out of this homogenising zone will remain below the degradation threshold. Preferably, the melt temperature of the polyethylene composition coming out of this homogenising zone is in range of 265 to 310° C. and most preferably at about 275 to 295° C. The melt temperature is measured with a temperature probe immersed 2 centimeters deep in the polymer at the exit of the homogenising equipment.

The average shear rate applied in the homogenising zone is preferably kept as low as possible. Generally, the average shear rate in the homogenising zone does not exceed 100 s$^{-1}$, preferably not 50 s$^{-1}$.

In this preferred embodiment of the method according to the invention, the compounding device is preferably a tandem assembly of a melting equipment and homogenising equipment. Both equipments can be exemplified by a continuous mixer or by an extruder, which may be of the single screw or twin screw type. Most preferred is a compounding device comprising a continuous mixer as melting device and an extruder, especially a single screw extruder, as homogenising device. When the homogenising device is a single screw extruder it may be constituted of classical conveying elements or it may comprise dispersive mixing elements developing shear and/or elongation stress. Preferably elements are used developing elongation stress with an application time of at least 0.5 seconds.

The compounding device used in the method according to the invention may comprise a gear pump as included in some conventional compounding devices. However it is preferred that a compounding device comprising no gear pump is used. The compounding device may be connected with other elements such as a screen changer and pelletizer as in conventional compounding devices.

The method according to the invention is very suitable for compounding multimodal polyethylene compositions comprising from 30 to 70% by weight of low molecular ethylene polymer having a melt flow rate $MI_2$, measured at 190° C. under a 2.16 kg load according ASTM 1286-90b, of 1 to 5000 g/10 min, preferably from 100 to 2000 g/10 min, and from 30 to 70% by weight of high molecular weight ethylene polymer having a melt flow rate HLMI, measured at 190° C. under a 21.6 kg load according ASTM 1286-90b, from 0.001 to 10.0 g/10 min, preferably from 0.001 to 1.0 g/10 min. Such multimodal polyethylene compositions are known in the art, they have for example being disclosed in U.S. Pat. No. 6,136,924 and U.S. Pat. No. 6,225,421. Usually the multimodal polyethylene compositions have a melt flow rate $MI_5$, measured at 190° C. under a 5 kg load according ASTM 1286-90b, from 0.01 to 10.0 g/10 min, preferably from 0.1 to 1.0 g/10 min and a density, measured according to ASTM D 792 standard, of 930 to 965 kg/m$^3$, preferably of 935 to 960 kg/m$^3$. In general, the density of the low molecular weight polyethylene present in the multimodal polyethylene composition is at least 960 kg/m$^3$, preferably at least 965 kg/m$^3$, most preferably at least 970 kg/m$^3$. In general, the density of the high molecular weight polyethylene present in the multimodal polyethylene composition is from 910 to 940 kg/m$^3$, preferably from 915 to 935 kg/m$^3$.

The method according to the invention has been very suitable for compounding multimodal polyethylene compositions comprising from 51 to 65% by weight of low molecular ethylene polymer having a melt flow rate $MI_2$ higher than 100 g/10 min and a density higher than 970 kg/m$^3$ and from 35 to 49% by weight of high molecular weight ethylene polymer having a melt flow rate HLMI from 0.001 to 1.0 g/10 min and a density lower than 928 kg/m$^3$. Usual compounding methods, such as single and twin screw extruders do generally not permit to obtain homogeneous compounds of these mixtures.

The multimodal polyethylene composition used in the method according to the invention may comprise further ethylene polymers having a melt flow rate different from the low molecular weight and the high molecular weight ethylene polymers. Generally, the total quantity of these ethylene polymers does not exceed 20%, preferably not 10%, by weight of the multimodal polyethylene composition.

The multimodal polyethylene composition used in the invention is preferably produced in a sequential step process, utilising reactors coupled in series and using different conditions in each reactor, the different fractions produced in the different reactors will each have their own molecular weight. Alternatively, the multimodal polyethylene composition may be produced by physically mixing the different ethylene polymers prepared separately. The multimodal polyethylene composition may also be produced by a combination of both preparation methods.

In the compounding method according to the invention, the different ethylene polymers forming the multimodal polyethylene composition may be added to the compounding device at the same time. Alternatively, some of the ethylene polymers or fractions of the different ethylene polymers may be added to the compounding device in a differentiated stage during the compounding process.

FIGS. 1 to 5 schematically represent some possible ways to execute the method according to the invention. In FIGS. 1 to 5, S1, S2 and S3 represent different ethylene polymers, one of which is a high molecular weight ethylene polymer and one of which is a low molecular weight ethylene polymer.

In FIG. 1, a multimodal polyethylene composition comprising 3 different ethylene polymers S1, S2 and S3 (obtained by sequential polymerisation or by physical mixing) is processed in compounding device comprising a melting zone M and a homogenising zone H.

Figure 2:
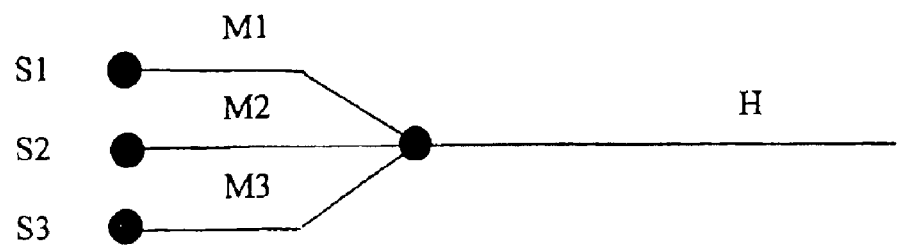
FIGS. 2–5 are schematic views of alternative methods.

In FIG. 2, the different ethylene polymers S1, S2 and S3 (separately polymerised) are molten in separate melting devices M1, M2 and M3 and mixed together before entering the homogenising zone H.

Figure 3:
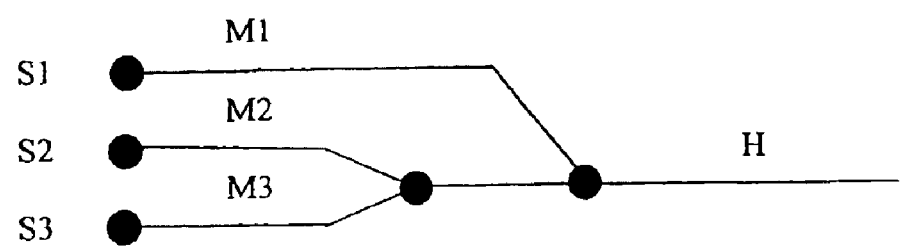

In FIG. 3, ethylene polymers S2 and S3 (separately polymerized) are molten in separate melting devices M2 and M3, mixed together before entering the homogenising zone and ethylene polymer S1 is molten in melting device M1 before addition to homogenising zone H in a differentiated stage.

Figure 4:
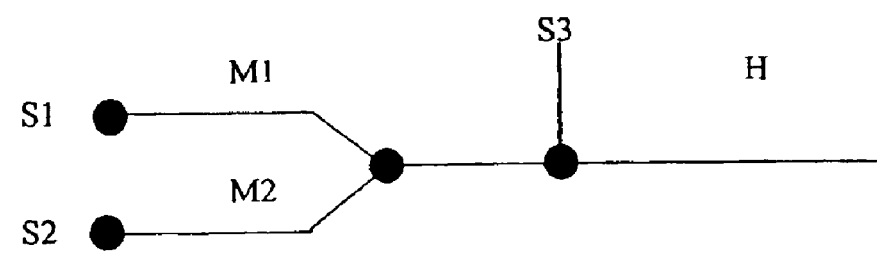

In FIG. 4, ethylene polymers S1 and S2 (separately polymerized) are molten in separate melting devices M1 and M2, mixed together before entering the homogenising zone and ethylene polymer S3 (in solid form) is added to homogenising zone H in a differentiated stage.

Figure 5:
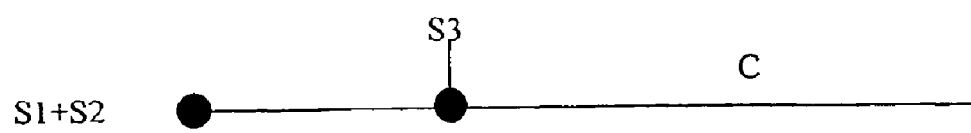

In FIG. 5, a mixture of ethylene polymers (obtained by sequential polymerisation or by physically mixing) is processed in the compounding device C and ethylene polymer S3 (in solid form) is processed in the compounding device C in a differentiated stage.

Additives usually added to polyethylene compositions, such as antioxidants, anti-UV agents, anti-static agents, dispersive aid agents, processing aids and pigments may be added to the multimodal polyethylene composition before or during compounding. The total content of these additives generally does not exceed 10 parts, preferably no more than 5 parts by weight per 100 parts by weight of multimodal polyethylene composition.

It has been surprisingly found that the addition of from 0.005 to 1 part by weight per 100 parts of multimodal polyethylene composition, of an antioxidant additive comprising a compound of the formula:

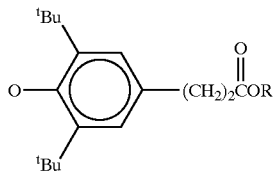

wherein R represents an alkyl or an alkenyl chain comprising from 8 to 35 carbon atoms, to the multimodal polyethylene composition enables the homogeneity of the resulting multimodal compound to be further improved so that substantially no gels appear any more. Antioxidant additives responding to formula (I) are well known. Goods results have been obtained with stearyl beta-(3,5-di-t-butyl-4-hydroxyphenyl)propionate (R=$C_{18}H_{37}$). Such additive is for example commercialised under the name of Irganox® 1076. Especially preferred is the addition of an antioxidant additive comprising a compound of formula (I) in combination with a phosphite type antioxidant, more particularly in combination with tris(2,4-di-t-butylphenyl)-phosphite. Very good results can be obtained with an antioxidant additive comprising about 20% by weight of stearyl beta-(3,5-di-t-butyl-4-hydroxyphenyl)propionate and about 80% by weight of tris(2,4-di-t-butylphenyl)-phosphite. Such antioxidant additive was for example commercialised under the name of Irganox® B900.

The method of compounding multimodal polyethylene compositions according to the invention can provide a homogeneous compounded material, also called a multimodal compound, containing a low level of white spots or gels, without substantially any degradation of the polymers present in the composition.

The quality of the multimodal compounds obtained with the compounding method described above can be measured according to ISO 13949 (1997) standard. Generally, the method of the invention can provide a dispersion quotation according to this standard which is lower than 3 for pigment and "white spots", and lower than 1.5 for "white spots" alone. The distribution quotation is usually A2–B1 for pigment and "white spots".

The method of the invention can provide a compound having a low quantity of gels. Completely gel-free quality can be obtained. The presence of gels is quantified by counting the "gels" (manually or with optical cameras) on blown films having a 200 microns thickness made from the compound.

The present examples illustrate the method according to the invention.

EXAMPLE 1 (ACCORDING TO THE INVENTION)

A multimodal polyethylene composition was prepared by polymerisation in two reactors disposed in series. The multimodal composition had a density of 954.0 kg/m³ and a melt index $MI_5$ of 0.35 g/10 min and comprised:

60.3 part by weight of low molecular weight polyethylene having a density of 975.1 kg/m³ and a melt index $MI_2$ of 772 g/10 min;

39.7 part by weight of high molecular weight polyethylene (ethylene-hexene copolymer) having a density of 920.2 kg/m³ and a melt index HLMI of 0.1 g/10 min.

To this multimodal polyethylene composition were added, for 100 parts of multimodal polyethylene composition, 0.35 part by weight of antioxidant IRGANOX® B225, 0.10 part by weight of calcium stearate and 2.25 parts by weight of carbon black.

The resultant composition was extruded on a compounding device comprising a melting zone (single screw extruder, 90 mm screw diameter, 24 D length) and a homogenising zone (single screw extruder, 90 mm diameter screw, 36 D length) according to the conditions specified in table 1. At the end of the compounding device, the resulting compound was passed through a strand pelletizer and pellets of the resulting compound were recuperated and examined. The results obtained are presented in table 2.

EXAMPLE 2 (ACCORDING TO THE INVENTION)

Example 1 was reproduced under the conditions specified in Table 1, by adding to the multimodal composition of Example 1, per 100 parts by weight of multimodal polyethylene composition: 0.35 part by weight of antioxidant IRGANOX® B225, 0.25 part by weight of antioxidant IRGANOX® B900, 0.10 part by weight of calcium stearate and 2.25 parts by weight of carbon black.

EXAMPLES 3 and 4 (ACCORDING TO THE INVENTION)

A multimodal polyethylene composition was prepared by polymerisation in two reactors disposed in series having a density of 955.6 kg/m³ and a melt index $MI_5$ of 0.6 g/10 min and comprising:

59.5 parts by weight of low molecular weight polyethylene having a density of 973.5 kg/m³ and a melt index $MI_2$ of 581 g/10 min;

40.5 part by weight of high molecular weight polyethylene (ethylene-hexene copolymer) having a density of 925.0 kg/m³ and a melt index HLMI of 0.17 g/10 min.

To this multimodal polyethylene composition were added, for 100 parts by weight of multimodal polyethylene composition, 0.35 part by weight of antioxidant IRGANOXO® B225, 0.10 part of calcium stearate and 2.25 parts of carbon black.

The resultant composition was extruded on the compounding device described in Example 1 according to the conditions specified in Table 1. The results obtained are presented in Table 2.

EXAMPLE 4R (COMPARATIVE)

The additive-containing multimodal composition described in Example 1 was extruded on a twin screw extruder (commercial Werner® ZSK 40 extruder, run in adiabatic mode, comprising a twin screw of 40 mm diameter, 26 D length) and a strand pelletizer, in the conditions specified in Table 3.

The properties of the resulting compound are presented in Table 4.

EXAMPLE 5 (ACCORDING TO THE INVENTION)

A multimodal polyethylene composition was prepared by polymerisation in two reactors in series. The multimodal composition had a density of 948.5 kg/m³ and a melt index $MI_5$ of 0.31 g/10 min and comprised:

49.0 part by weight of low molecular weight polyethylene having a density of 973.0 kg/m³ and a melt index $MI_2$ of 398 g/10 min;

51.0 part by weight of high molecular weight polyethylene (ethylene-hexene copolymer) having a density of 923.4 kg/m³ and a melt index HLMI of 0.21 g/10 min.

To this multimodal polyethylene composition were added, for 100 parts of multimodal polyethylene composition, 0.35 parts by weight of antioxidant IRGANOX® B225, 0.10 parts by weight of calcium stearate and 2.25 parts by weight of carbon black.

This additivated composition was extruded on the compounding device described in Example 1 according to the conditions specified in Table 1. The results obtained are presented in Table 2.

EXAMPLE 6 (ACCORDING TO THE INVENTION)

A multimodal polyethylene composition was prepared by polymerisation in two reactors in series. The multimodal composition had a density of 953.9 kg/m³ and a melt index $MI_5$ of 0.28 g/10 min and comprised:

61.3 part by weight of low molecular weight polyethylene having a density of 973.5 kg/m³ and a melt index $MI_2$ of 400 g/10 min;

38.7 part by weight of high molecular weight polyethylene (ethylene-hexene copolymer) having a density of 918.0 kg/m³ and a melt index HLMI of 0.06 g/10 min.

To this multimodal polyethylene composition were added, for 100 parts of multimodal polyethylene composition, 0.35 parts by weight of antioxidant IRGANOX® B225, 0.10 parts by weight of calcium stearate and 2.25 parts by weight of carbon black.

This additivated composition was extruded on the compounding device described in Example 1 according to the conditions specified in Table 1. The results obtained are presented in Table 2.

EXAMPLES 7R, 8R, and 9R (COMPARATIVE)

The additive-containing composition described in Example 3 was extruded on a twin screw extruder (commercial Werner® E ZSK 40 extruder, run with controlled temperature profile, comprising a twin screw of 40 mm diameter, 26 D length) and a strand pelletizer, in the conditions specified in Table 3.

The properties of the resulting compound are presented in Table 4.

TABLE 2

| Ex. | Pigment dispersion ISO 13949 | White spot dispersion ISO 13949 | Pigment distribution ISO 13949 | Gels on 200 micron films number/kg |
|---|---|---|---|---|
| 1 | 2.3 | 1.0 | A2 | 17700 |
| 2 | 2.5 | 1.0 | A2 | 2300 |
| 3 | 2.5 | 1.0 | A2 | 6250 |
| 4 | 4.2 | 1.5 | B1 | 9850 |
| 5 | 1.9 | <1.0 | A1 | 0 |
| 6 | 1.7 | 1.5 | B1 | 3900 |

TABLE 3

| | | | Twin screw extruder | | |
|---|---|---|---|---|---|
| Ex. | Rate kg/h | Total residence time (s) | screw speed rpm | $SEC_{melting}$ kWh/kg | t° melt ° C. |
| 4R | 7 | 45 | 150 | 0.260 | 307 |
| 7R | 20 | 20 | 330 | 0.265 | 263 |
| 8R | 30 | 20 | 330 | 0.260 | 261 |
| 9R | 40 | 20 | 330 | 0.255 | 257 |

TABLE 4

| Ex. | White spot dispersion ISO 13949 | Pigment distribution ISO 13949 | Gels on 200 micron films number/kg |
|---|---|---|---|
| 4R | 10 | C2 | countless |
| 7R | 7 | C1 | 12600 |
| 8R | 10 | D1 | 36100 |
| 9R | 15 | D2 | countless |

We have also found that compounded materials produced according to the invention have improved physical properties. For example, stress crack resistance (ESCR) and creep resistance are improved compared with resins compounded according to the prior art method, for example with shorter residence times.

What is claimed is:

1. A method of compounding a multimodal polyethylene composition in a compounding device, comprising:

a) compounding a multimodal polyethylene composition in a compounding device for a total residence time of at least 1.5 minutes, b) applying a total drive specific energy (SEC) on the polyethylene composition of from 0.270 to 0.460 kWh/kg, and

TABLE 1

| | | Melting zone | | | Homogenising zone | | | | | Total specific |
|---|---|---|---|---|---|---|---|---|---|---|
| Ex | Rate kg/h | screw speed rpm | $SEC_{melting}$ kWh/kg | t° melt$^{out}$ ° C. | screw speed rpm | $SCC_{homog}$ kWh/kg | $SCC_{homog}$ kWh/kg | t° melt$^{out}$ ° C. | Total res time s | Total SEC kWh/kg | energy applied (SEC-SCC) |
| 1 | 75 | 112 | 0.231 | 239 | 30 | 0.139 | 0.090 | 273 | 270 | 0.340 | 0.250 |
| 2 | 75 | 112 | 0.234 | 239 | 30 | 0.156 | 0.105 | 276 | 300 | 0.360 | 0.255 |
| 3 | 75 | 112 | 0.224 | 233 | 30 | 0.140 | 0.080 | 275 | 270 | 0.334 | 0.254 |
| 4 | 100 | 150 | 0.250 | 246 | 40 | 0.140 | 0.073 | 283 | 240 | 0.350 | 0.277 |
| 5 | 75 | 113 | 0.242 | 271 | 20 | 0.115 | 0.115 | 272 | 300 | 0.357 | 0.242 |
| 6 | 40 | 150 | 0.245 | 276 | 10 | 0.083 | 0.085 | 276 | 540 | 0.328 | 0.243 | c) optionally, applying a specific cooling energy (SCC) of at most 0.200 kWh/kg on the polyethylene composition, wherein the total specific energy, which is the difference between the total drive specific energy (SEC) and any specific cooling energy (SCC), applied on the polyethylene composition is from 0.220 to 0.330 kWh/kg.

2. Method according to claim 1, wherein the total residence time of the polyethylene composition in the compounding device is at least 2 minutes.

3. Method according to claim 2, wherein the total residence time of the polyethylene composition in the compounding device is at least 3 minutes.

4. Method according to claim 3, wherein the total residence time of the polyethylene composition in the compounding device is between 4.5 and 10 minutes.

5. Method according to any one of claims 1–4, wherein the total drive specific energy (SEC) applied on the polyethylene composition is from 0.305 to 0.415 kWh/kg and wherein the specific cooling energy (SCC) applied on the polyethylene composition is from 0.045 to 0.145 kWh/kg.

6. Method according to claim 1, wherein the compounding drive comprises at least one melting zone preceding at least one homogenizing zone.

7. Method according to claim 6, wherein the drive specific energy applied to the composition in the melting zone ($SEC_{melting}$) is from 0.190 to 0.260 kWh/kg.

8. Method according to claim 6 or 7, wherein the temperature of the composition coming out of the melting zone and entering the homogenizing zone is from 220 to 300° C.

9. Method according to claim 6, wherein the residence time of the polyethylene composition in the homogenizing zone is at least 2 minutes.

10. Method according to claim 6, wherein the drive specific energy applied to the polyethylene composition in the homogenizing zone ($SEC_{homogenizing}$) is from 0.080 to 0.200 kWh/kg and wherein a specific cooling energy ($SCC_{homogenizing}$) from 0.045 to 1.45 kWh/kg is applied on the polyethylene composition in the homogenizing zone.

11. Method according to claim 6, wherein the temperature of the composition coming out of the homogenizing zone is from 265 to 310° C.

12. Method according to claim 6, wherein the homogenizing zone comprises a single screw extruder.

13. Method according to claim 12, wherein the single screw extruder comprises mixing elements developing shear and/or elongation stress.

14. Method according to claim 1, wherein from 0.005 to 1 part, per 100 parts of the multimodal polyethylene composition, of a antioxidant additive comprising a compound of formula:

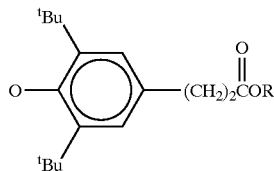

wherein R represents an alkyl or an alkenyl chain comprising from 8 to 35 carbon atoms, is added to the multimodal polyethylene composition.

15. Method according to claim 1 wherein the multimodal polyethylene composition has a melt flow rate $MI_5$ from 0.01 to 10.0 g/10 min and a density of 930 to 965 kg/m³ and comprises from 30 to 70% by weight of a low molecular weight ethylene polymer having a melt flow rate $MI_2$ from 1 to 5000 g/10 mm and a density of at least 960 kg/m³, and from 30 to 70% by weight of a high molecular weight ethylene polymer having a melt flow rate HLMI from 0.001 to 10.0 g/10 mm and a density of 910 to 940 kg/m³.

* * * * *

UNITED STATES PATENT AND TRADEMARK OFFICE
CERTIFICATE OF CORRECTION

PATENT NO. : 6,900,266 B2
DATED : May 31, 2005
INVENTOR(S) : Marie-France Raty

It is certified that error appears in the above-identified patent and that said Letters Patent is hereby corrected as shown below:

Column 12,
Line 33, "5000 g/10 mm" should read -- 5000 g/10 min --.
Line 36, "10.0g/10 mm" should read -- 10.0g/10 min --.

Signed and Sealed this

Twenty-fourth Day of January, 2006

JON W. DUDAS
*Director of the United States Patent and Trademark Office*